US011947285B2

(12) United States Patent
Tsuruga et al.

(10) Patent No.: US 11,947,285 B2
(45) Date of Patent: Apr. 2, 2024

(54) IMAGE FORMING APPARATUS WITH COATED BELT PRESSING MEMBER

(71) Applicant: CANON KABUSHIKI KAISHA, Tokyo (JP)

(72) Inventors: Ryosuke Tsuruga, Chiba (JP); Manato Kobayashi, Chiba (JP); Yutaka Kakehi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/971,207

(22) Filed: Oct. 21, 2022

(65) Prior Publication Data

US 2023/0130018 A1 Apr. 27, 2023

(30) Foreign Application Priority Data

Oct. 22, 2021 (JP) ................................ 2021-173543

(51) Int. Cl.
*G03G 15/16* (2006.01)

(52) U.S. Cl.
CPC ....... *G03G 15/161* (2013.01); *G03G 15/1615* (2013.01)

(58) Field of Classification Search
CPC ......................... G03G 15/161; G03G 15/1615
See application file for complete search history.

(56) References Cited

U.S. PATENT DOCUMENTS

2021/0397112 A1* 12/2021 Tsuruga ............... G03G 15/161

FOREIGN PATENT DOCUMENTS

| | | | | |
|---|---|---|---|---|
| EP | 3106925 A1 * | 11/2020 | ............. G03G 15/00 |
| JP | 11-305559 A | 11/1999 | |
| JP | 4680721 B2 | 5/2001 | |
| JP | 2002-031965 A | 1/2002 | |
| JP | 2019-133203 A | 8/2019 | |

* cited by examiner

*Primary Examiner* — Sophia S Chen
(74) *Attorney, Agent, or Firm* — Venable LLP

(57) ABSTRACT

An image forming apparatus includes an image forming portion, a rotatable endless belt, a plurality of stretching rollers including an inner roller and an upstream roller, an outer member, a guiding member, a sheet-like pressing member, and a coating member. The coating member is disposed on the pressing member so as not to contact the belt and is electrically grounded or electrically conducted to the guiding member. The coating member is formed of a material lower in surface resistivity than the pressing member.

9 Claims, 11 Drawing Sheets

| | PRESSING MEMBER STRUCTURE | | | TRANSFER BIAS APPLYING METHOD | | SURFACE POTENTIAL | | | G. C. R. AFTER SHT PSSNG | I. E. R. |
|---|---|---|---|---|---|---|---|---|---|---|
| EXP. No. | PRSSNG MEMBER | COATING MEMBER | CNDCTN RLTNSHP | H. V. APPLY MEMBER | H. V. V. | PRESSING MEMBER (BELT) | FEEDING GUIDE | S. P. DFRNC | | |
| 1 | PPS | CARBON-CONTAINING POLYETHYLENE SHEET | GROUNDED | OUTER ROLLER | +7kV | +0. 1kV | −0. 2kV | +0. 3kV | ○ | ○ |
| 2 | PPS | CARBON-CONTAINING POLYETHYLENE SHEET | CNDCTN WITH GUIDE | OUTER ROLLER | +7kV | +1. 0kV | +1. 0kV | +0. 0kV | ○ | ○ |
| 3 | PPS | PLATINUM COATING | GROUNDED | OUTER ROLLER | +7kV | +0. 0kV | −0. 2kV | +0. 2kV | ○ | ○ |
| 4 | PPS | CARBON-CONTAINING POLYETHYLENE SHEET | GROUNDED | INNER ROLLER | −7kV | −0. 1kV | −0. 2kV | +0. 1kV | ○ | ○ |
| 5 | PPS | NO | | INNER ROLLER | −7kV | −2. 0kV | −0. 2kV | −1. 8kV | × × | ○ |
| 6 | PPS | NO | | OUTER ROLLER | +7kV | +1. 0kV | −0. 2kV | +1. 2kV | × | ○ |
| 7 | PPS | CARBON-CONTAINING POLYETHYLENE SHEET (ONLY UPSTREAM SIDE) | GROUNDED | OUTER ROLLER | +7kV | +1. 0kV | −0. 2kV | +1. 2kV | △ | ○ |
| 8 | PPS | CARBON-CONTAINING POLYETHYLENE SHEET (CONTACT POSITION WITH BELT) | GROUNDED | OUTER ROLLER | +7kV | +0. 1kV | −0. 2kV | +0. 3kV | ○ | × |

Fig. 11

IMAGE FORMING APPARATUS WITH COATED BELT PRESSING MEMBER

FIELD OF THE INVENTION AND RELATED ART

The present invention relates to an image forming apparatus, such as a copying machine, a printer, a plotter, a facsimile machine, or a multi-function machine having a plurality of functions of the foregoing machines, of an electrophotographic type or an electrostatic recording type.

Conventionally, as the image forming apparatus of the electrophotographic type, there is an image forming apparatus using an endless belt as an image bearing member for bearing a toner image. As such a belt, for example, there is an intermediary transfer belt used as a second image bearing member for feeding a sheet-like recording material such as paper from a photosensitive member or the like as a first image bearing member. In the following principally, an image forming apparatus of an intermediary transfer type including an intermediary transfer belt will be described as an example.

In the image forming apparatus using the intermediary transfer belt, a toner image formed on the photosensitive member or the like is primary-transferred onto the intermediary transfer belt at a primary transfer portion. Then, the toner image primary-transferred on the intermediary transfer belt is secondary-transferred onto the recording material at a secondary transfer portion. By an inner member (inner secondary transfer member) provided on an inner peripheral surface side and an outer member (outer secondary transfer member) provided on an outer peripheral surface side, the secondary transfer portion (secondary transfer nip) which is a contact portion between the intermediary transfer belt and the outer member is formed. As the inner member, an inner roller (inner secondary transfer roller) which is one of a plurality of stretching rollers for stretching the intermediary transfer belt is used. As the outer member, an outer roller (outer secondary transfer roller) which is provided at a position opposing the inner roller while nipping the intermediary transfer belt between itself and the inner roller and which is pressed toward the inner roller is used in many instances. Further, a voltage of a polarity opposite to a charge polarity of toner is applied to the outer roller (or a voltage of the same polarity as the charge polarity of the toner is applied to the inner roller) so that the toner image is secondary-transferred from the intermediary transfer belt onto the recording material in the secondary transfer portion. Further, in general, with respect to a feeding direction of the recording material, on a side upstream of the secondary transfer portion, a feeding guide for guiding the recording material to the secondary transfer portion is provided.

In recent years, with diversification of the recording material in a commercial printing market, it is required that image quality specifications are satisfied in various conditions from low-rigidity thin paper to high-rigidity thick paper. Here, depending on rigidity of the recording material, behavior of the recording material changes in the neighborhood of the secondary transfer portion on a side upstream of the secondary transfer portion with respect to the recording material feeding direction and has the influence on an image which is a product in some instances. For example, depending on the rigidity of the recording material, when a leading end or a trailing end of the recording material with respect to a feeding direction enters the secondary transfer portion, image defect due to vibration of the intermediary transfer belt in the neighborhood of an upstream portion of the above-described secondary transfer portion with respect to a rotational direction of the intermediary transfer belt ("shock image" at the leading end or the trailing end of the recording material) is liable to occur in some instances.

Therefore, a constitution in which a shape of a stretched surface of the intermediary transfer belt in the neighborhood of the secondary transfer portion or a position of the secondary transfer portion is changed has been known.

For example, in Japanese Patent No. 4680721, a constitution in which an urging (pressing) member for urging (pressing) the intermediary transfer belt from a back surface (side) of the intermediary transfer belt is provided and in which a penetration amount (entering amount) of this urging member against the intermediary transfer belt is changed depending on a thickness of the recording material has been disclosed.

However, the urging member for urging the intermediary transfer belt from the back surface of the intermediary transfer belt is charged by friction with a traveling intermediary transfer belt in some instances. Particularly, in the neighborhood of the secondary transfer portion, a charge amount of the urging member becomes relatively large in some instances by the influence of a high voltage applied to transfer members (inner roller and outer roller).

When the urging member is charged, an electric field is formed between the urging member and a feeding guide (conveying guide) provided upstream of the secondary transfer portion with respect to the recording material feeding direction. By this electric field, toner scatters from the intermediary transfer belt side to the feeding guide, so that the feeding guide is contaminated with the toner in some cases.

When the feeding guide is contaminated with the toner, the toner unintentionally deposited on the recording material causes toner contamination of the recording material. For that reason, there is a need to clean the feeding guide by a user or a service person. Accordingly, by suppressing toner scattering to the feeding guide, it is desired to not only reduce a risk of the toner contamination of the recording material but also reduce a service load (cleaning operation).

SUMMARY OF THE INVENTION

A principal object of the present invention is to provide an image forming apparatus capable of suppressing toner scattering to a feeding guide in a constitution in which an urging member (pressing member) for urging (pressing) a belt from a back surface of the belt is provided.

The object has been accomplished by the image forming apparatus according to the present invention.

According to an aspect of the present invention, there is provided an image forming apparatus comprising: an image forming portion configured to form a toner image; a rotatable endless belt onto which the toner image is transferred; a plurality of stretching rollers including an inner roller and an upstream roller provided upstream of and adjacent to the inner roller with respect to a rotational direction of the belt and configured to stretch the belt; an outer member provided opposed to the inner roller through the belt and configured to form a transfer portion where the toner image is transferred from the belt onto a recording material in contact with an outer peripheral surface of the belt; a guiding member configured to guide the recording material to the transfer portion; a sheet like pressing member contactable to an inner peripheral surface of the belt on a side upstream of the inner roller and downstream of the upstream roller with respect to the rotational direction of the belt; and a coating member provided on a surface of the pressing member on a belt side and configured to cover the surface of the pressing member, wherein the coating member is disposed on the pressing member so as not to contact the belt and is electrically grounded or electrically conducted to the guiding member, the coating member being formed of a material lower in surface resistivity than the pressing member.

Further features of the present invention will become apparent from the following description of exemplary embodiments with reference to the attached drawings.

Figure 2:
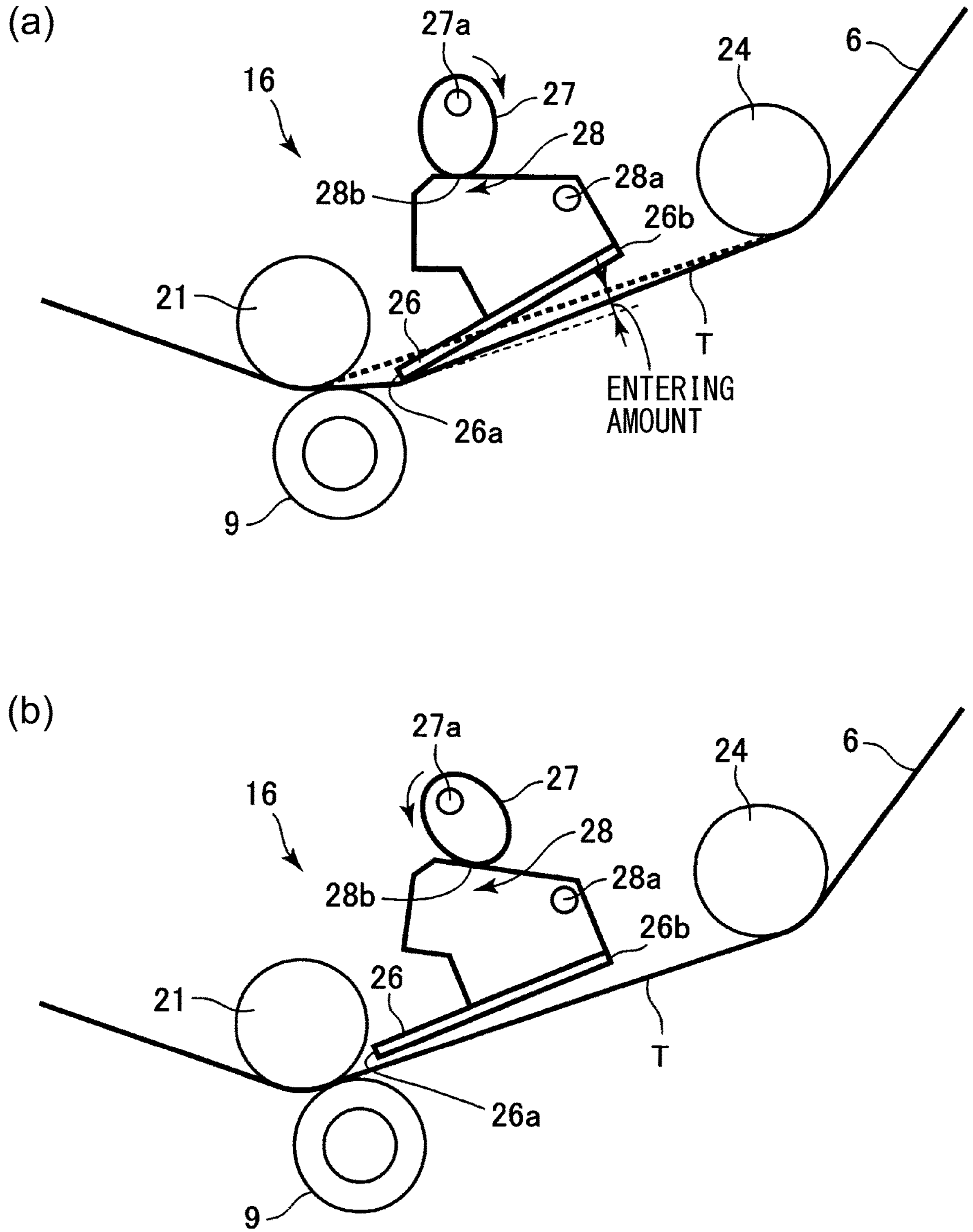

Parts (a) and (b) FIG. 2 are schematic state views showing a pressing mechanism.

Figure 3:
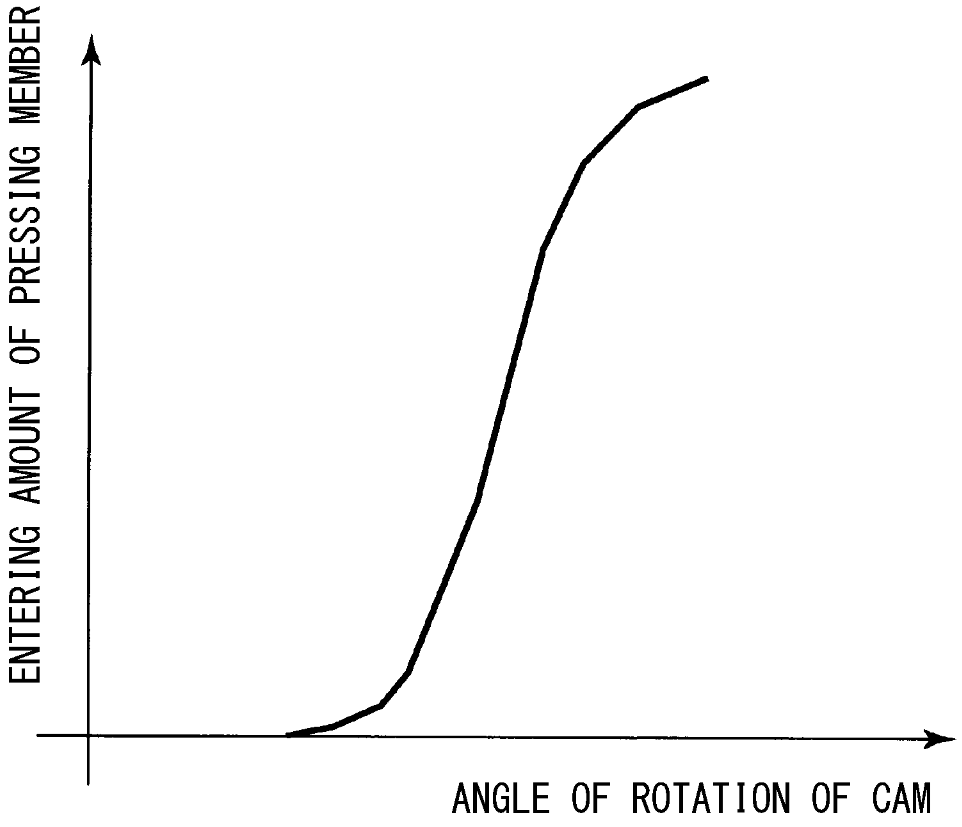

FIG. 3 is a graph showing a relationship between an angle of rotation of a cam and a penetration (entering) amount of a pressing member (urging member).

Figure 4:
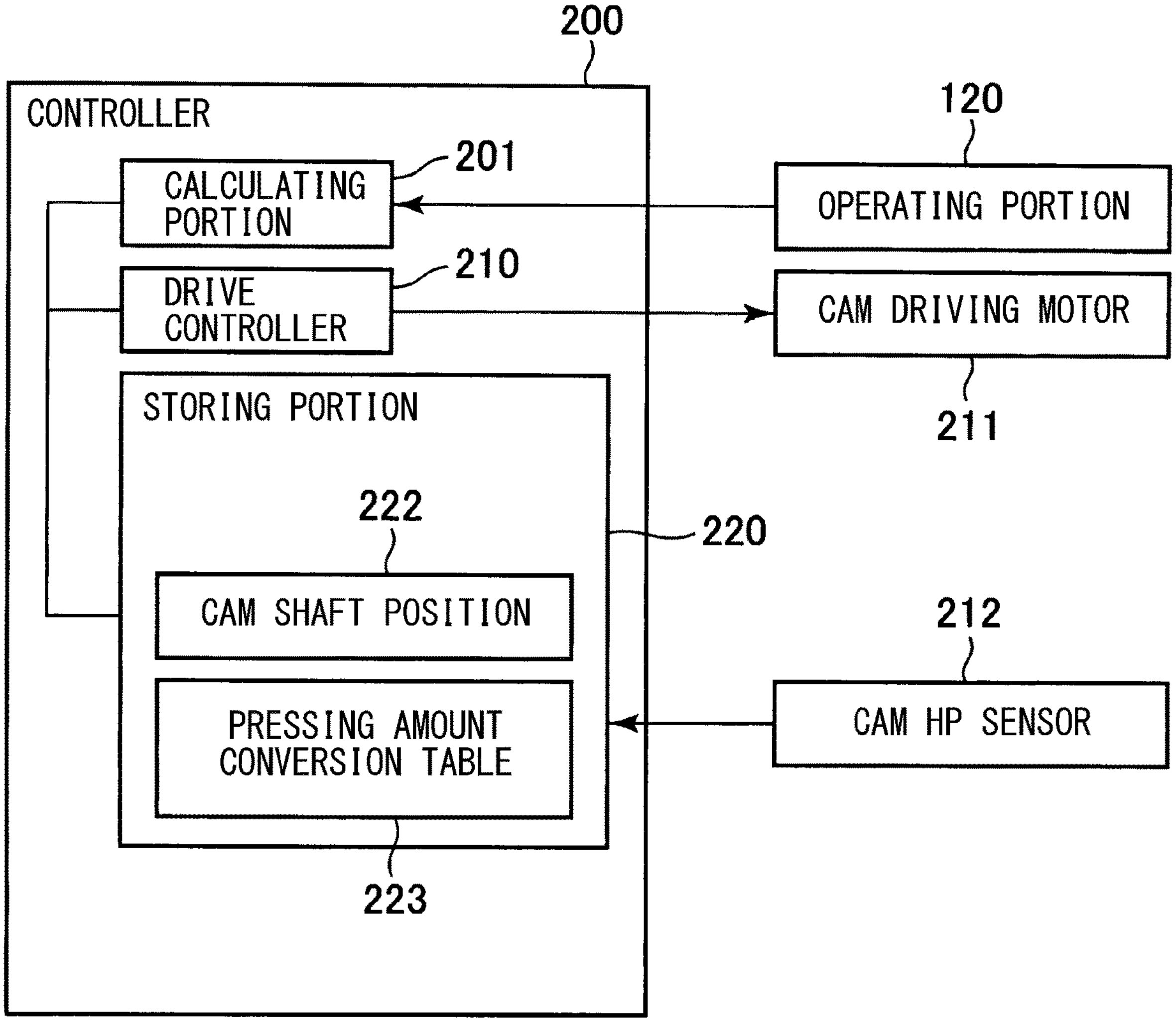

FIG. 4 is a schematic block diagram showing a control mode of a principal part of the image forming apparatus.

Figure 5:
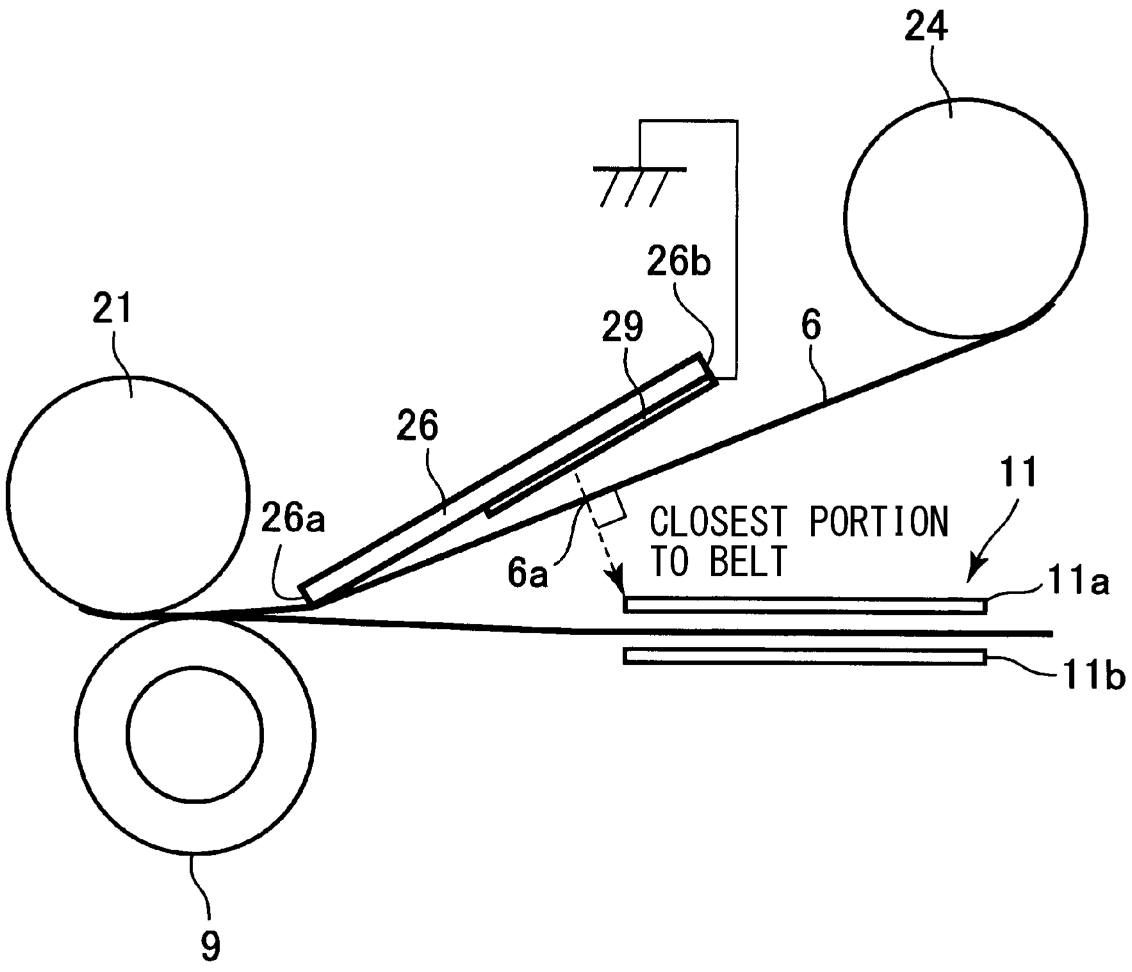

FIG. 5 is a schematic sectional view showing a constitution of an experiment example 1 (embodiment 1) in the neighborhood of a pressing member.

Figure 6:
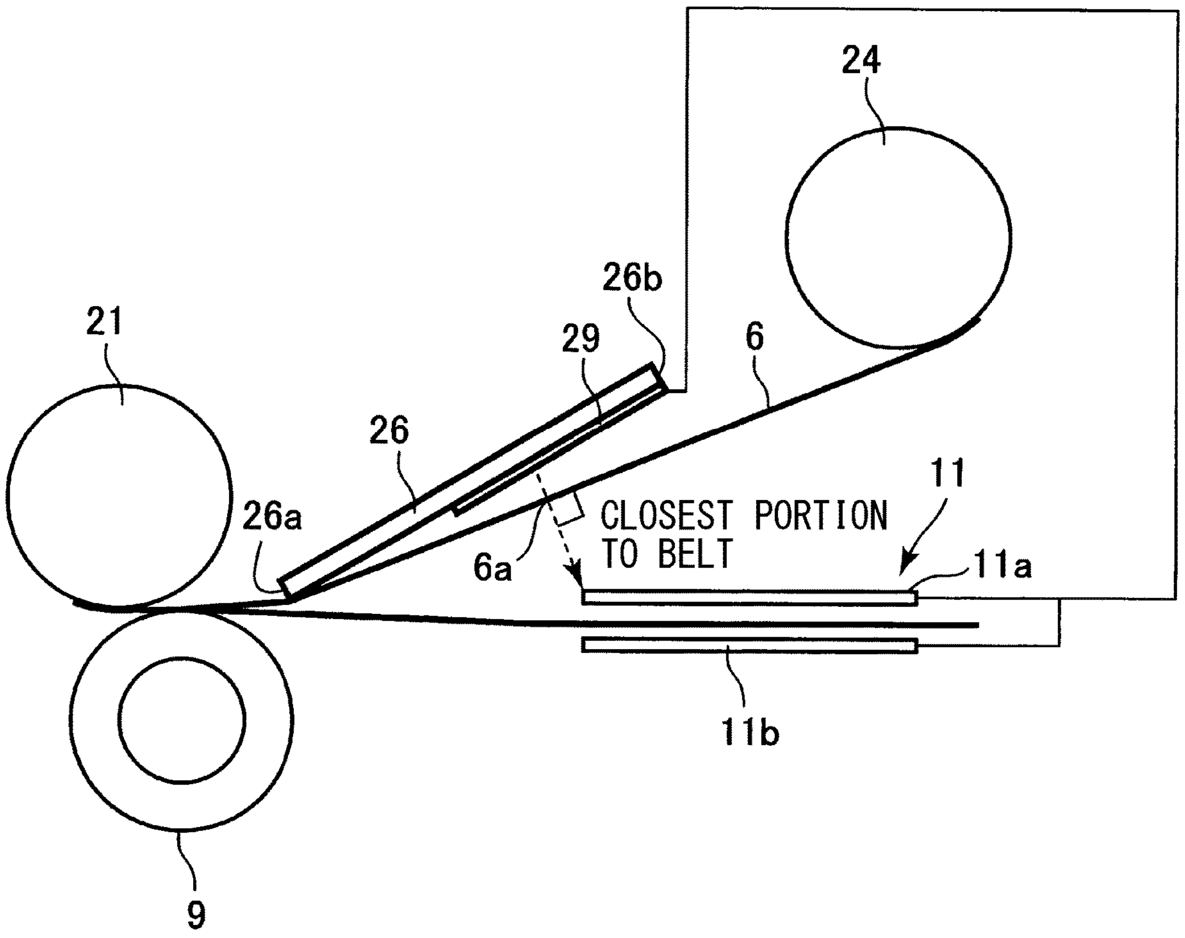

FIG. 6 is a schematic sectional view showing a constitution of an experiment example 2 (embodiment 1) in the neighborhood of a pressing member.

Figure 7:
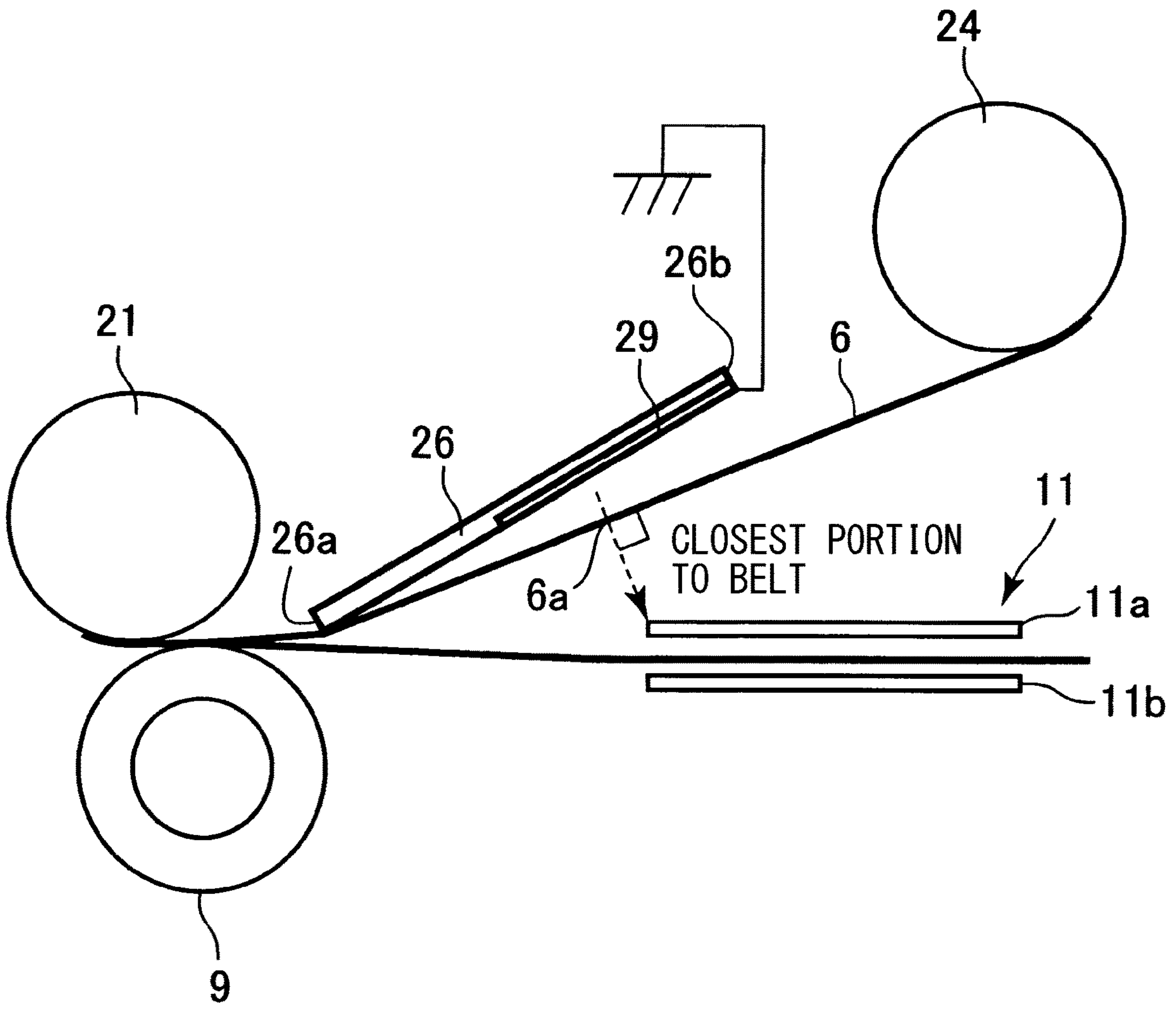

FIG. 7 is a schematic sectional view showing a constitution of an experiment example 3 (embodiment 1) in the neighborhood of a pressing member.

Figure 8:
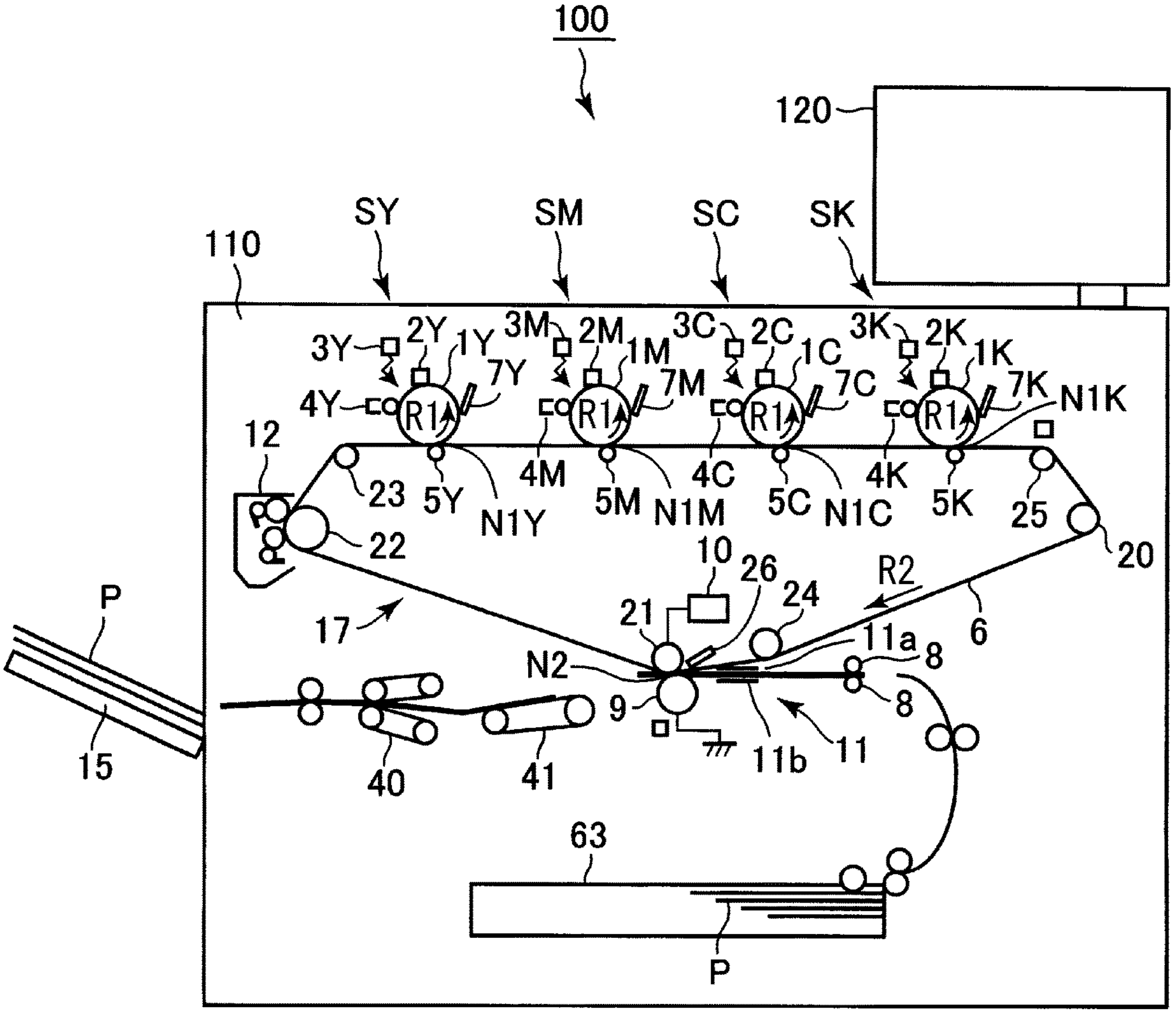

FIG. 8 is a schematic sectional view showing a constitution of an image forming apparatus according to an experiment example 4 (embodiment 1).

Figure 9:
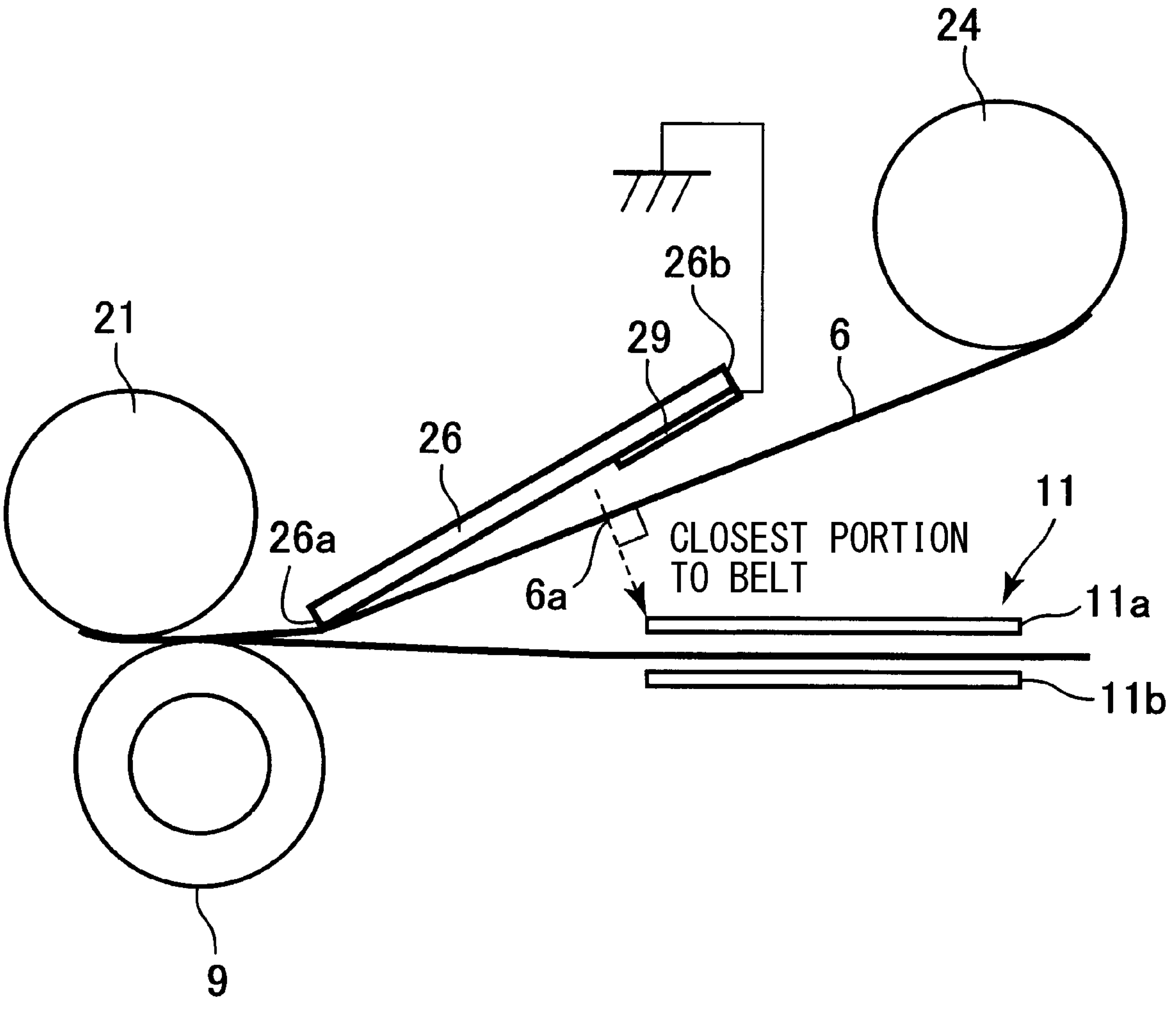

FIG. 9 is a schematic sectional view showing a constitution of an experiment example 7 (embodiment 1) in the neighborhood of a pressing member.

Figure 10:
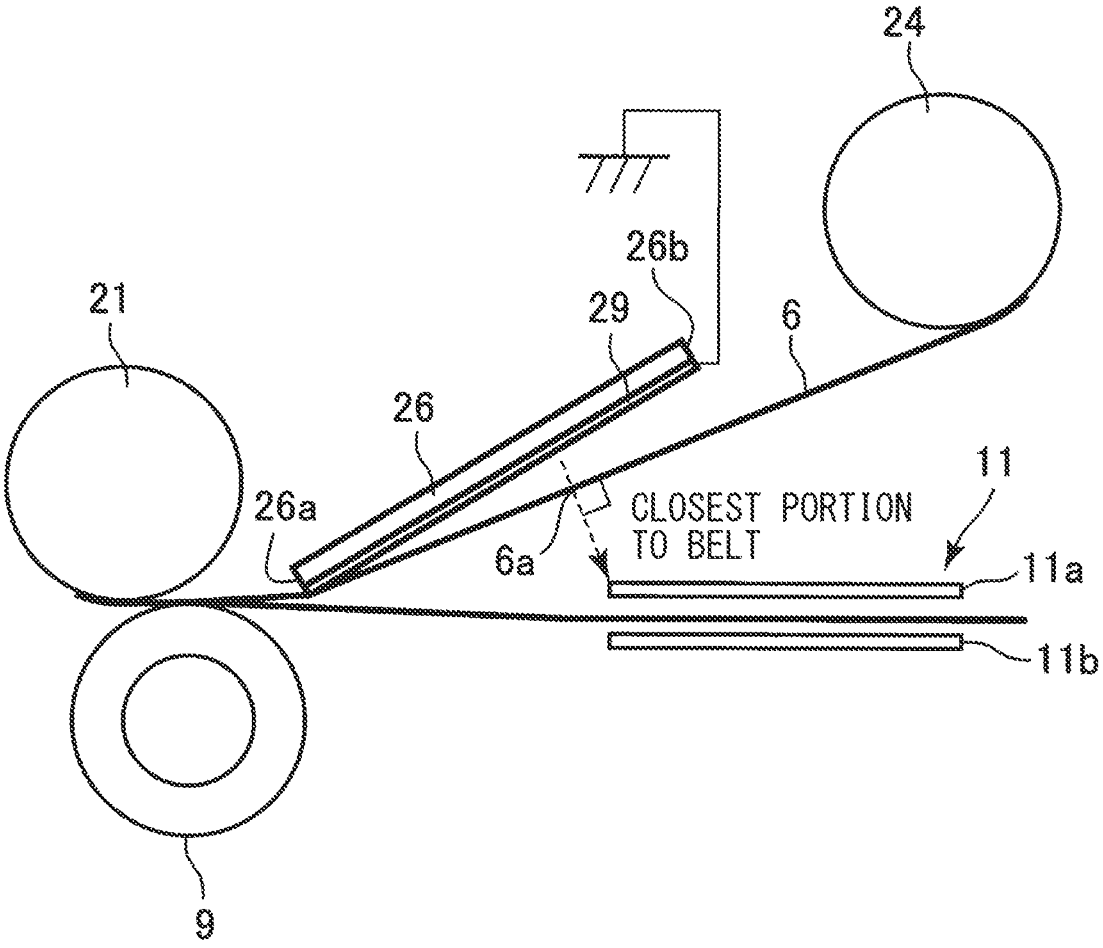

FIG. 10 is a schematic sectional view showing a constitution of an experiment example 8 (comparison example) in the neighborhood of a pressing member.

FIG. 11 is a table showing a result of an evaluation experiment.

DESCRIPTION OF THE EMBODIMENTS

In the following, an image forming apparatus according to the present invention will be specifically described with reference to the drawings.

Embodiment 1

1. General Constitution and Operation of Image Forming Apparatus

Figure 1:
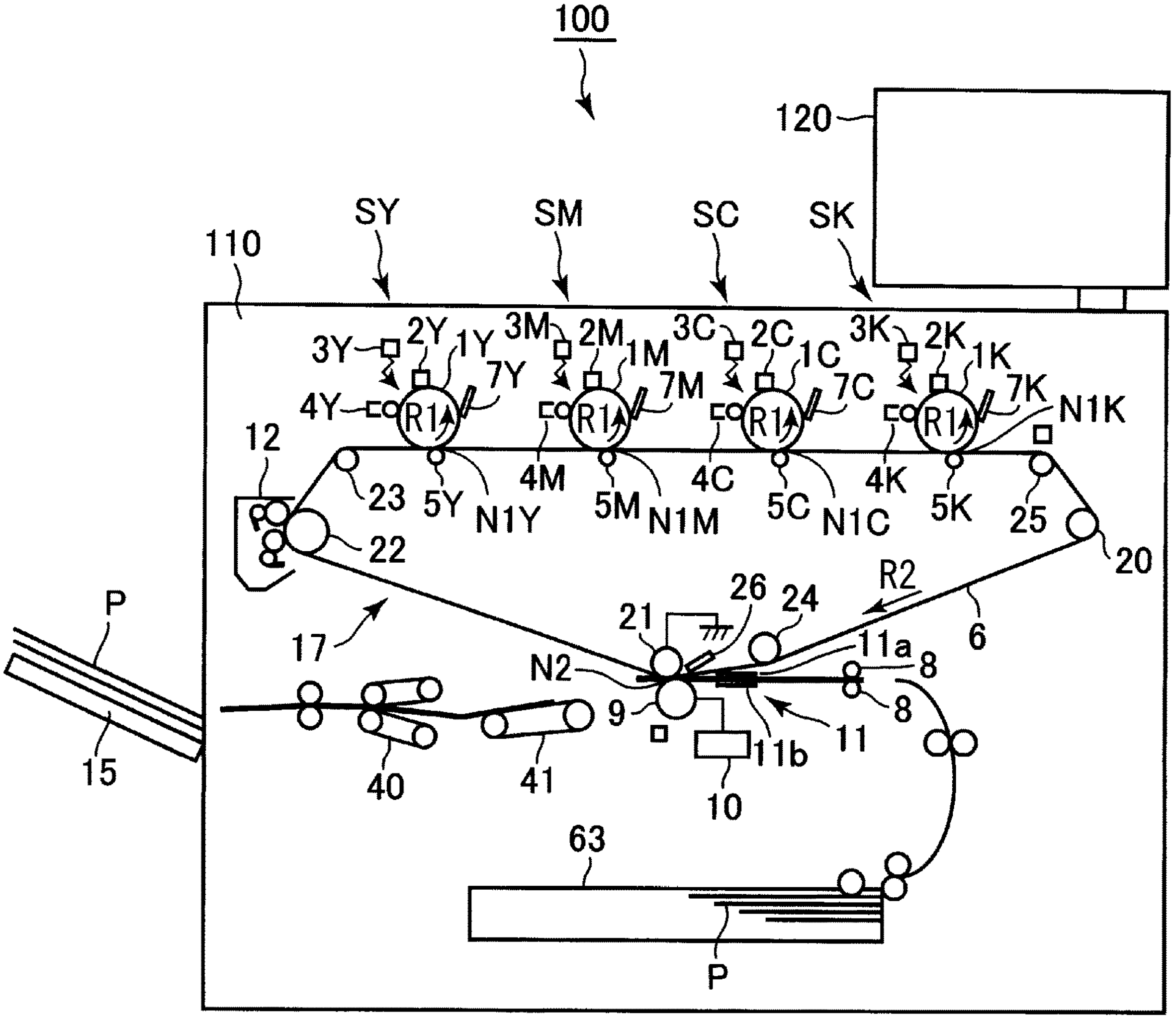
FIG. 1 is a schematic sectional view of an image forming apparatus.

FIG. 1 is a schematic sectional view of an image forming apparatus 100 of this embodiment. The image forming apparatus 100 of this embodiment is a tandem multi-function machine (having functions of a copying machine, a printer and a facsimile machines) of an intermediary transfer type. For example, in accordance with an image signal sent from an external device such as a personal computer, the image forming apparatus 100 is capable of forming a full-color image on a sheet-like recording material (a transfer material, a sheet material, a recording medium, media) P such as paper by using an electrophotographic type process.

The image forming apparatus 100 includes, as a plurality of image forming portions (stations), four image forming portions SY, SM, SC and SK for forming images of yellow (Y), magenta (M), cyan (C) and black (K). These image forming portions SY, SM, SC and SK are disposed in line along a movement direction of an image transfer surface disposed substantially parallel to an intermediary transfer belt 6. As regards elements of the image forming portions SY, SM, SC and SK having the same or corresponding functions or constitutions, suffixes Y, M, C and K for representing the elements for associated colors are omitted, and the elements will be collectively described in some instances. In this embodiment, the image forming portion S is constituted by including a photosensitive drum 1 (1Y, 1K, 1C, 1K), a charging device 2 (2Y, 2M, 2C, 2K), an exposure device 3 (3Y, 3M, 3C, 3K), a developing device 4 (4Y, 4M, 4C, 4K), a primary transfer roller 5 (5Y, 5M, 5C, 5K), a drum cleaning device 7 (7Y, 7M, 7C, 7K) and the like, which are described later.

To the photosensitive drum 1 which is a rotatable drum-shaped (cylindrical) photosensitive member (electrophotographic photosensitive member) as a first image bearing member for bearing a toner image, a driving force is transmitted from a driving motor (not shown) as a driving source, so that the photosensitive drum 1 is rotationally driven in an arrow R1 direction (counterclockwise direction) of FIG. 1. A surface of the rotating photosensitive drum 1 is electrically charged uniformly to a predetermined a polarity (negative in this embodiment) and a predetermined potential by the charging device 2 as a charging means. The charged surface of the photosensitive drum 1 is subjected to scanning exposure to light depending on an image information (image signal) by the exposure device 3 as an exposure means (electrostatic image forming means), so that an electrostatic latent image (electrostatic image) is formed on the photosensitive drum 1. In this embodiment, the exposure device 3 is constituted by a laser scanner device for irradiating the surface of the photosensitive drum 1 with laser light modulated depending on the image information (image signal). The electrostatic latent image formed on the photosensitive drum 1 is developed (visualized) by supplying toner as a developer by the developing device 4 as a developing means, so that a toner image (developer image) is formed on the photosensitive drum 1. In this embodiment, the toner charged to the same polarity (negative polarity in this embodiment) as a charge polarity of the photosensitive drum 1 is deposited on an exposed portion (image portion) of the photosensitive drum 1 where an absolute value of the potential is lowered by exposing to light the surface of the photosensitive drum 1 after the photosensitive drum 1 is uniformly charged (reverse development type). In this embodiment, a normal charge polarity of the toner which is a charge polarity of the toner during development is a negative polarity.

As a second image bearing member for bearing the toner image, the intermediary transfer belt 6 which is a rotatable intermediary transfer member constituted by an endless belt is provided so as to oppose the four photosensitive drums 1Y, 1M, 1C and 1K. The intermediary transfer belt 6 is extended around and stretched under predetermined tension by a plurality of stretching (supporting) rollers including a driving roller 22, an upstream auxiliary roller 23, a downstream auxiliary roller 25, a tension roller 20, a pre-secondary transfer roller 24 and an inner roller 21. The driving roller 22 transmits a driving force to the intermediary transfer belt 6. The tension roller 20 imparts the predetermined tension to the intermediary transfer belt 6, and controls the tension of the intermediary transfer belt 6 to a certain level. The pre-secondary transfer roller 24 forms a surface of the intermediary transfer belt 6 in the neighborhood of a secondary transfer portion N2 (described later) on a side upstream of the secondary transfer portion N2 with respect to a rotational direction (surface movement direction, traveling direction, conveying (feeding) direction) of the intermediary transfer belt 6. The inner roller (secondary transfer opposite roller, inner secondary transfer roller, inner member) 21 functions as an opposing member (opposite electrode) of an outer roller 9 (described later). The upstream auxiliary roller 23 and the downstream auxiliary roller 25 form the image transfer surface disposed substantially horizontally. The driving roller 22 is rotationally driven by transmission of the driving force thereto from a belt driving motor (not shown) as a driving source. By this, the driving force is inputted from the driving roller 22 to the intermediary transfer belt 6, so that the intermediary transfer belt 6 is rotated (circulated and moved) in an arrow R2 direction (clockwise direction) in FIG. 1. In this embodiment, the intermediary transfer belt 6 is rotationally driven so that a peripheral speed thereof is 150-470 m/sec. Of the plurality of stretching rollers, the stretching rollers other than the driving roller 22 are rotated by rotation of the intermediary transfer belt 6.

On the inner peripheral surface side of the intermediary transfer belt 6, the primary transfer rollers 5Y, 5M, 5C and 5K which are roller-like primary transfer members as primary transfer means are disposed correspondingly to the respective photosensitive drums 1Y, 1M, 1C and 1K. The primary transfer roller 5 is urged toward an associated photosensitive drum 1 through the intermediary transfer belt 6, whereby a primary transfer portion (primary transfer nip) N1 (N1Y, N1M, N1C, N1K), which is a contact portion between the photosensitive drum 1 and the intermediary transfer belt k is formed. Further, on an inner peripheral surface side of the intermediary transfer belt 6, an urging (pressing) member 26 is provided upstream of the inner roller 21 and downstream of the pre-secondary transfer roller 24 with respect to the rotational direction of the intermediary transfer belt 6. The urging member 26 contacts an inner peripheral surface of the intermediary transfer belt 6 and is capable of urging (pressing) the intermediary transfer belt from the inner peripheral surface side toward an outer peripheral surface side. By this, the urging member 26 is capable of causing a stretched surface T (FIG. 2) of the intermediary transfer belt 6 formed between the inner roller 21 and the pre-secondary transfer roller 24 to project from the inner peripheral surface side toward the outer peripheral surface side of the intermediary transfer belt 6. The urging member 26 and an urging mechanism 16 (FIG. 2) for changing a position of this urging member 26 will be further described later.

The toner image formed on the photosensitive drum 1 as described above is primary-transferred onto the rotating intermediary transfer belt 6 at the primary portion N1 by the action of the primary transfer roller 5. During the primary transfer, to the primary transfer roller 23, a primary transfer voltage, (primary transfer bias) subjected to constant-voltage control, which is a DC voltage of an opposite polarity (positive in this embodiment) to a normal charge polarity of the toner is applied by an unshown primary transfer voltage source. For example, during full-color image formation, the color toner images of yellow, magenta, cyan and black formed on the respective photosensitive drums 1 are successively primary-transferred superposedly onto the same image forming region of the intermediary transfer belt 6. In this embodiment, the primary transfer portion N1 is an image forming position where the toner image is formed on the intermediary transfer belt 6. The intermediary transfer belt 6 is an example of an endless belt rotatable while feeding the toner image carried in the image forming position.

On an outer peripheral surface side of the intermediary transfer belt 6, at a position opposing the inner roller 21, an outer roller (outer secondary transfer roller, secondary transfer roller, outer member) 9 which is a roller-like secondary transfer member (rotatable transfer member) as a secondary transfer means is provided. The outer roller 9 is urged toward the inner roller 21 through the intermediary transfer belt 6 and forms the secondary transfer portion (secondary transfer nip) N2 as a secondary transfer portion which is a contact portion between the intermediary transfer belt 6 and the outer roller 9. The toner images formed on the intermediary transfer belt 6 as described above are secondary-transferred onto a recording material P sandwiched and fed by the intermediary transfer belt 6 and the outer roller 9 at the secondary transfer portion N2 by the action of the outer roller 9. In this embodiment, during the secondary transfer, to the outer roller 9, a secondary transfer voltage (secondary transfer bias) which is a DC voltage, subjected to constant-voltage control, of the opposite polarity (positive in this embodiment) to the normal charge polarity of the toner is applied by a secondary transfer voltage source (high-voltage applying means) 10. In this embodiment, for example, the secondary transfer voltage of +1 to +7 kV is applied and thus a secondary transfer current of +40 to +120 μA is caused to flow, so that the toner images are transferred from the intermediary transfer belt 6 onto the recording material P. In this embodiment, the inner roller 21 is electrically grounded (connected to the ground). Incidentally, the inner roller 21 is used as a secondary transfer member and a secondary transfer voltage of the same polarity as the normal charge polarity of the toner is applied thereto, and the outer roller 9 is used as an opposite electrode and may also be electrically grounded.

The recording material P is fed to the secondary transfer portion N2 by being timed to the toner image on the intermediary transfer belt 6. That is, the recording material P accommodated in a recording material cassette 63 as a recording material accommodating portion is fed to a pair of registration rollers (registration roller pair) 8 which is a feeding member as a feeding means and is once stopped by the registration rollers 8. Then, this recording material P is sent into the secondary transfer portion N2 by rotational drive of the registration rollers 8 so that the toner image on the intermediary transfer belt 6 coincides with a desired image forming region on the recording material P in the secondary transfer portion N2.

With respect to the feeding direction of the recording material P, a feeding guide 11 for guiding the recording material P to the secondary transfer portion N2 is provided downstream of the registration rollers pairs 8 and upstream of the secondary transfer portion N2. The feeding guide 11 is constituted by including a first guiding member (upper guiding member) 11*a* contactable to a front surface of the recording material P (i.e., a surface onto which the toner image is to be transferred immediately after the recording material P passes through the feeding guide 11) and a second guiding member (lower guiding member) 11*b* contactable to a back surface of the recording material P (i.e., a surface opposite from the front surface). The first guiding member 11*a* and the second guiding member 11*b* are disposed opposed to each other, and the recording material P passes through between these members. The first guiding member 11*a* restricts movement of the recording material P in a direction toward the intermediary transfer belt 6. The second guiding member 11*b* restricts movement of the recording material P in a direction away from the intermediary transfer belt 6. The feeding guide 11 (first and second guiding members 11*a* and 11*b*) is provided for improving feeding accuracy when the recording material P is supplied to the secondary transfer portion. In this embodiment, the feeding guide 11 (first and second guiding members 11*a* and 11*b*) is formed by a metal plate constituted by metal (electroconductive member) such as SUS (stainless steel). Further, in this embodiment, a length of the feeding guide 11 (first and second guiding members 11*a* and 11*b*) with respect to a longitudinal direction (widthwise direction of the intermediary transfer belt 6) is equal to a length of the intermediary transfer belt 6 with respect to the widthwise direction.

The recording material P on which the toner images are transferred is fed by a pre-fixing feeding device 41 toward a fixing device 40 as a fixing means. The pre-fixing feeding device 41 includes a rotatable belt member formed, at a central portion with respect to a direction substantially perpendicular to the feeding direction of the recording material P, of a rubber material such as EPDM, having a width of 100-110 mm with respect to the direction and a thickness of 1-3 mm. The pre-fixing feeding device 41 feeds the recording material P while carrying the recording material P on the belt member. This belt member is perforated with holes of 3-7 mm in diameter, and air is sucked from the inner peripheral surface side, so that a carrying force of the recording material P is enhanced and thus a feeding property of the recording material P is stabilized. The fixing device 40 heats and presses the recording material P carrying thereon unfixed toner images in a process in which the recording material P is nipped and fed by a rotatable fixing member pair and thus fixes (melts) the toner images on the surface of the recording material P. Thereafter, the recording material P on which the toner images are fixed is discharged (outputted) to a discharge tray 15 provided on an outside of an apparatus main assembly 110 of the image forming apparatus 100 by a discharging roller pair or the like which is a discharging member as a discharging means.

On the other hand, toner (primary transfer residual toner) remaining on the photosensitive drum 1 after the primary transfer is removed and collected from the surface of the photosensitive drum 1 by a drum cleaning device 7 as a photosensitive member cleaning means. Further, deposited matters such as toner (secondary transfer residual toner) remaining on the intermediary transfer belt 6 after the secondary transfer, and paper powder guided from the recording material P are removed and collected from the surface of the intermediary transfer belt 6 by a belt cleaning device 12 as an intermediary member cleaning means. In this embodiment, the belt cleaning device 12 electrostatically collects and removes the deposited matters such as the secondary transfer residual toner or the like on the intermediary transfer belt 6.

Incidentally, in this embodiment, an intermediary transfer belt unit 17 as a belt feeding device is constituted by including the intermediary transfer belt 6 stretched by the plurality of stretching rollers, the respective primary transfer rollers 5, the belt cleaning device 12, a frame supporting these members, and the like. The intermediary transfer belt unit 17 is mountable to and dismountable from the apparatus main assembly 110 for maintenance and exchange.

Here, as the intermediary transfer belt 6, a belt constituted by a resin-based material formed in a single layer structure or a multi-layer structure including an elastic layer constituted by an elastic material can be used.

Further, in this embodiment, the primary transfer roller 5 is constituted by providing an elastic layer formed with an ion-conductive foam rubber on an outer peripheral surface of a core metal (core material) made of metal. Further, in this embodiment, the primary transfer roller 5 is 15-20 mm in outer diameter and is $1\times10^5$ to $1\times10^8\Omega$ in electric resistance value in the case where the electric resistance is measured under application of a voltage of 2 kV in an environment of 23° C. and 50% RH.

Further, in this embodiment, the outer roller 9 is constituted by providing an elastic layer formed with an ion-conductive foam rubber on an outer peripheral surface of a core metal (core material) made of metal. Further, in this embodiment, the outer roller 9 is 20-25 mm in outer diameter and is $1\times10^5$ to $1\times10^8\Omega$ in electric resistance value in the case where the electric resistance is measured under application of a voltage of 2 kV in an environment of 23° C. and 50% RH. Further, in this embodiment, the outer roller 9 is rotatably supported by bearings at opposite end portions thereof with respect to a rotational axis direction. The bearings are slidable (movable) in a direction toward and away from the inner roller 21 and are pressed toward the inner roller 21 by urging spring (not shown) constituted by compression springs which are urging members (elastic members) as urging means. By this, the outer roller 9 contacts the intermediary transfer belt 6 toward the inner roller 21 at predetermined pressure and forms the secondary transfer portion N2.

Further, in this embodiment, the inner roller 21 is constituted by providing an elastic layer formed with an electroconductive rubber on an outer peripheral surface of a core metal (core material) made of metal. Further, in this embodiment, the inner roller 21 is 20-22 mm in outer diameter and is $1\times10^5$-$1\times10^8\Omega$ in electric resistance value in the case where the electric resistance value is measured under application of a voltage of 50 V in an environment of 23° C. and 50% RH. Incidentally, the pre-secondary transfer roller 24 may also have the same constitution as the constitution of the inner roller 21, for example.

Further, in this embodiment, rotational axis directions of the stretching rollers including the inner roller 21 for the intermediary transfer belt 6 and the outer roller 9 are substantially parallel to each other.

2. Pressing Member and Pressing Mechanism

Next, the pressing member 26 and the pressing mechanism (position changing mechanism variable mechanism) 16 for changing the position of this pressing member 26 will be described. Parts (a) and (b) of FIG. 2 are schematic side views of a portion in the neighborhood of the secondary transfer portion N2 in this embodiment as seen from a one end portion side (front side on the drawing sheet of FIG. 1) with respect to a rotational axis direction of the inner roller 21 in a direction substantially perpendicular to the rotational axis direction. Part (a) of FIG. 2 shows a state in which the pressing member 26 urges the intermediary transfer belt 6 with a predetermined pressing force, and part (b) of FIG. 2 shows a state in which the pressing member 26 is spaced from the intermediary transfer belt 6. In parts (a) and (b) of FIG. 2, a structure at the one end portion with respect to the rotational axis direction of the inner roller 21 is shown, but a structure at the other end portion is similar thereto (i.e., is substantially symmetrical therewith with respect to a center with respect to the rotational axis direction of the inner roller 21).

In this embodiment, the image forming apparatus 100 includes a sheet-like (plate-like) pressing member (back-up sheet, back-up member) 26. The pressing member 26 is capable of causing the intermediary transfer belt 6 to project outward by urging (pressing) the inner peripheral surface of the intermediary transfer belt 6 in the neighborhood of the secondary transfer portion N2. With respect to the rotational direction of the intermediary transfer belt 6, the pressing member 26 is disposed upstream of the inner roller 21 and downstream of the pre-secondary transfer roller 24 so as to be contactable to the inner peripheral surface of the intermediary transfer belt 6. Particularly, in this embodiment, with respect to the feeding direction of the recording material P, the pressing member 26 is disposed so as to be contactable to the inner peripheral surface of the intermediary transfer belt 6 at a position opposing a position of a feeding guide 11 (first and second guiding members 11*a* and 11*b*) provided upstream of the inner roller and downstream of a free end of the feeding guide 11 on a downstream side.

In this embodiment, the pressing member 26 is constituted by a sheet-like (plate-like) member which has a substantially rectangular shape in a plan view and which has a predetermined length with respect to each of a longitudinal direction substantially parallel to a widthwise direction of the intermediary transfer belt 6 (substantially perpendicular to a surface movement direction of the intermediary transfer belt 6) and a short-side direction substantially perpendicular to the longitudinal direction and which has a predetermined thickness. Incidentally, the widthwise direction of the intermediary transfer belt 6 is a direction substantially perpendicular to the movement direction of the surface of the intermediary transfer belt 6. The length of the pressing member 26 with respect to the longitudinal direction is equal to the length of the intermediary transfer belt 6 with respect to the widthwise direction. When a function of pressing the intermediary transfer belt 6 can be achieved, the length of the pressing member 26 in the longitudinal direction may be substantially equal to the length of the intermediary transfer belt 6 in the widthwise direction and may also be longer or shorter than the length of the intermediary transfer belt 6 in the widthwise direction. The pressing member 26 includes a free end portion, which is one end portion (end portion on a downstream side of the rotational direction of the intermediary transfer belt 6), contactable to the inner peripheral surface of the intermediary transfer belt 6 over a substantially full width of the intermediary transfer belt 6 and capable of pressing the intermediary transfer belt 6.

Incidentally, an end portion of the pressing member 26 on a free end portion side with respect to the short-side direction is referred to as a leading end 26*a*, and an end portion of the pressing member 26 on a fixing end portion side with respect to the short-side direction is referred to as a base end 26*b*.

In this embodiment, the image forming apparatus 100 includes the pressing mechanism (position change mechanism, moving mechanism) 16. The pressing mechanism 16 changes a position of the pressing member 26 and thus changes at least one (both in this embodiment) of a penetration amount (urging amount) of the pressing member 26 into the intermediary transfer belt 6 and a state in which the pressing member 26 is contacted to or spaced from the intermediary transfer belt 6. Incidentally, in this embodiment, for simplicity, a change in penetration amount (urging amount) of the pressing member 26 into the intermediary transfer belt 6 is described as including a change in state in which the pressing member 26 is contacted to or spaced from the intermediary transfer belt 6 in some instances. Further, in this embodiment, for simplicity, a change (adjustment) in position of the pressing member 26 is described simply as a change (adjustment) in penetration amount (urging amount) is some instances.

The pressing member 26 is rotatably held by a holding member (pressing member holder) 28 as a supporting member. The pressing member 26 is fixed to the holding member 28 over a substantially full width thereof with respect to the longitudinal direction at a fixed end portion thereof which is one end portion (an upstream end portion with respect to the rotational direction of the intermediary transfer belt 6) with respect to the short-side direction thereof. The holding member 28 is supported by a frame or the like of the intermediary transfer belt unit 17 so as to be rotatable about a rotation shaft (pressing member rotation shaft) 28*a*. Thus, the holding member 28 is rotated about the rotation shaft 28*a*, and thus the pressing member 26 is rotated about the rotation shaft 28*a*, so that the position of the pressing member 26 can be changed. By this, at least one (both in this embodiment) of the penetration amount (urging amount) of the pressing member 26 into the intermediary transfer belt 6 and the state in which the urging member 26 is contacted to or spaced from the intermediary transfer belt 6 can be changed.

The holding member 28 is constituted so as to be rotated by the action of a cam (urging cam) 27. The cam 27 is supported by the frame or the like of the intermediary transfer belt unit 17 so as to be rotatable about a cam rotation shaft 27*a*. The cam 27 is rotated about the cam rotation shaft 27*a* by receiving drive from a cam driving motor 211 (FIG. 4) as a driving source. Further, the cam 27 contacts a cam follower 28*b* provided as a part of the holding member 28. Further, in this embodiment, the holding member 28 is urged by a holding member urging means (not shown) constituted by a tensile spring or the like which is another urging member (elastic member) as another urging means so that the cam follower 28*b* engages with the urging cam 27. In this embodiment, the image forming apparatus 100 is provided with a cam position sensor (cam HP sensor) 212 (FIG. 4) as a position detecting means for detecting a position of the urging cam 27 with respect to the rotational direction, particularly a home position (HP) with respect to the rotational direction. The cam position sensor 212 can be constituted by, for example, a flag as an indicating portion provided on or coaxially with the cam 27 and a photo-interrupter as a detecting portion.

Thus, in this embodiment, the pressing mechanism 16 is constituted by including the holding member 28, the cam 27, the cam driving motor 211, the cam position sensor 212, the holding member urging means (not shown), and the like.

As shown in part (a) of FIG. 2, when the intermediary transfer belt 6 is urged by the pressing member 26, the cam 27 is rotated clockwise by being driven by the cam driving motor 211. By this, the holding member 28 is rotated counterclockwise about the rotation shaft 28*a*, so that a state in which the pressing member 26 is disposed at a position where the penetration amount of the pressing member 26 into the intermediary transfer belt 6 is predetermined penetration amount is formed. At this time, the leading end 26*a* of the pressing member 26 contacts the inner peripheral surface of the intermediary transfer belt 6 in the neighborhood of the secondary transfer portion N2 and causes the intermediary transfer belt 6 to project outward.

Further, as shown in part (b) of FIG. 2, when the pressing member 26 is spaced from the intermediary transfer belt 6, the urging cam 27 is rotated counterclockwise by being driven by the cam driving motor 211. By this, the holding member 28 is rotated clockwise about the urging member rotation shaft 28*a*, so that a state in which the pressing member 26 is disposed at a position where the pressing member 26 is spaced from the intermediary transfer belt 6 is formed.

As shown in part (a) of FIG. 2, when the pressing member 26 contacts the intermediary transfer belt 6 and urges the intermediary transfer belt 6 with a predetermined urging force, a stretched surface T of the intermediary transfer belt 6 is changed, so that tension in the neighborhood the secondary transfer portion N2 becomes strong. By this, vibration of the intermediary transfer belt 6 can be suppressed, so that the "shock image" at the leading end and the trailing end of the recording material P can be alleviated.

Further, in this embodiment, the cam 27 has a shape such that the penetration amount (urging amount) of the pressing member 26 into the intermediary transfer belt 6 changes depending on an angle of rotation. By this, in this embodiment, by controlling the angle of rotation of the cam 27, it becomes possible to adjust the penetration amount (urging amount) of the pressing member 26 into (against) the intermediary transfer belt 6. In this embodiment, a controller 200 (FIG. 4) (described later) controls the cam driving motor 211, and thus carries out control so that the pressing member 26 urges the intermediary transfer belt 6 with the predetermined pressing force or so that the urging member 26 is spaced from the intermediary transfer belt 6. FIG. 3 is a graph showing a relationship between the angle of rotation of the cam 27 and an entering (penetration) amount (pressing amount) of the pressing member 26 into the intermediary transfer belt 6 in this embodiment.

In this embodiment, an initial set value (predetermined urging force) of the pressing member 26 into (against) the intermediary transfer belt 6 is set at 1.0-3.0 mm. Farther, in this embodiment, the pressing member 26 can be disposed at a position spaced from the intermediary transfer belt 6 or at a position where the pressing member 26 contacts the intermediary transfer belt 6 with a penetration amount (urging amount) of 0-3.0 mm. Incidentally, the present invention is not limited thereto, but this penetration amount (urging amount) may suitably be about 3.5 mm or less. In the case where the penetration amount (urging amount) is larger than this value, a load exerted on a contact surface between the pressing member 26 and the intermediary transfer belt 6 increases, and therefore, there is a possibility that the intermediary transfer belt 6 is not readily rotated smoothly.

Here, it is desirable that the pressing member 26, specifically, the leading end 26*a* of the pressing member 26, is moved close to the inner roller 21 to the extent possible, but the pressing member 26 may desirably be disposed so as not to contact the inner roller 21. The pressing member 26 can be disposed so that the inner peripheral surface of the intermediary transfer belt 6 and the leading end 26*a* of the pressing member 26 are in contact with each other at a position, for example, about 2 mm or more, typically about 10 mm or more away from the position, where the inner roller 21 and the intermediary transfer belt 6 are in contact with each other, toward an upstream side of the rotational direction of the intermediary transfer belt 6. Further, the pressing member 26 is disposed so that the inner peripheral surface of the intermediary transfer belt 6 and the leading end of the pressing member 26 are in contact with each other at a position, for example, about 40 mm or less, typically about 25 mm or less away from the position, where the inner roller 21 and the intermediary transfer belt 6 are in contact with each other, toward the upstream side of the rotational direction of the intermediary transfer belt 6. By this, a shape of the stretching surface of the intermediary transfer belt 6 in the neighborhood of the secondary transfer portion N2 can be sufficiently changed. That is, typically, the pressing member 26 is disposed so that the leading end 26*a* thereof contacts the back surface of the intermediary transfer belt 6 in a position where the pressing member 26 is spaced from a contact position between the inner roller 21 and the intermediary transfer belt 6 toward an upstream side by 10-40 mm so as not to contact the inner roller 21.

Further, the penetration amount (urging amount) of the pressing member 26 into the intermediary transfer belt 6 may only be required to be a predetermined value when the recording material P passes through the neighborhood of an inlet of the secondary transfer portion N2 and the secondary transfer portion N2. The neighborhood of the inlet of the secondary transfer portion N2 is specifically a region corresponding to a region of the intermediary transfer belt 6 from a position, where the pressing member 26 contacts the intermediary transfer belt 6, to the secondary transfer portion N2 with respect to the feeding direction of the recording material P.

Further, when the image forming apparatus 100 is left standing in a state in which the pressing member 26 is disposed at a position where the pressing member 26 urges the intermediary transfer belt 6, it causes deformation of the pressing member 26 with time in some instances. For that reason, for example, in an OFF state of a main switch (power source) of the image forming apparatus 100 or in a sleep state of the image forming apparatus 100, as shown in part (b) of FIG. 2, the pressing member 26 can be disposed at a position where the pressing member 26 is spaced from the intermediary transfer belt 6.

Incidentally, the pressing amount in which the pressing member 26 is pressed against the intermediary transfer belt 6 can be represented by the following entering (penetration) amount in which the pressing member 26 enters (penetrates into) the intermediary transfer belt 6. This entering amount is roughly an amount such that the pressing member 26 causes the intermediary transfer belt 6 to project outward with respect to a stretched surface (stretching surface) T of the intermediary transfer belt 6 forward by stretching the intermediary transfer belt 6 by the inner roller 21 or the outer roller 9 and the pre-secondary transfer roller 24. The pre-secondary transfer roller 24 is an example of upstream rollers, of a plurality of stretching rollers, disposed adjacent to the inner roller 21 on a side upstream of the inner roller 21 with respect to the rotational direction of the intermediary transfer belt 6.

3. Control Mode

FIG. 3 is a schematic block diagram showing a control mode of a principal part of the image forming apparatus 100 in this embodiment. The controller 200 as a control means is constituted by including a CPU as a calculation control means which is a dominant element for performing processing, memories (storing media) such as a ROM and a RAM, which are used as storing means, and an interface portion (input/output circuit) and the like. In the RAM, which is rewritable memory, information inputted to the controller 200, detected information, a calculation result and the like are stored. In the ROM, a data table acquired in advance and the like are stored. The CPU and the memories are capable of transferring and reading the data therebetween. The interface portion controls input and output (communication) of signals between the controller 200 and devices connected to the controller 200.

To the controller 200, respective portions (the image forming portions S, the intermediary transfer belt 6, driving devices for the members relating to feeding of the recording material P, various voltage sources and the like) of the image forming apparatus 100 are connected. In a relationship with this embodiment, the controller 200 includes an arithmetic (operation) portion 201, a drive controller 210 and a storing portion 220. In this embodiment, the arithmetic portion 201 and the drive controller 210 are realized by operating the above-described CPU in accordance with associated programs. Further, in this embodiment, the storing portion 220 is realized by the above-described memory. To the drive controller 210, driving means for driving respective portions of the image forming apparatus 100, such as an urging cam driving motor 211, a drum driving motor, a belt driving motor, and the like motor are connected. By an instruction from the arithmetic portion 201, the drive controller 210 operates the driving means for driving the respective portions of the image forming apparatus 100, such as the urging cam driving motor 211 and the like.

Further, to the controller 200, the operating portion (operating panel) 120 provided on the image forming apparatus 100 is connected. The operating portion 120 includes a display portion (display means) for displaying information by control of the controller 200 and an input portion (input means) for inputting information to the controller 200 through an operation by an operator such as a user or a service person (in this embodiment, represented by the user). The operating portion 120 may be constituted by including a touch panel having functions of the display means and the input means. Further, to the controller 200, an image reading apparatus (not shown) provided in or connected to the image forming apparatus and an external device (not shown) such as a personal computer connected to the image forming apparatus 100 may also be connected.

The controller 200 causes the image forming apparatus 100 to perform the image forming operation by controlling the respective portions of the image forming apparatus 100 on the basis of information on a job (a series of operations which is started by a single start instruction and in which an image or images are formed and outputted on a single or plurality of recording materials P). The job information includes a start instruction (start signal) and information (instruction signal) on an image formation condition such as a kind of the recording material P, which are inputted from the operating portion 120 or the external device. Further, the job information includes image information (image signals) inputted from the external device or the operating portion 120.

4. Adjustment of Position of Pressing Member

Next, an adjusting method of the entering amount (position of the pressing member 26) in this embodiment will be specifically described.

As shown in FIG. 4, in this embodiment, in the storing portion 220, cam shaft position information 222 acquired from the cam position sensor 212 for detecting the home position (HP) of the cam 27 is stored. Further, in this embodiment, in the storing portion 220, in order to obtain an optimum member, a pressing amount conversion table 223 for rotationally driving the cam 27 to a predetermined position is stored.

The pressing amount conversion table 223 shows a relationship between the angle of rotation of the cam 27 and the penetration amount Y as shown in FIG. 3. On the basis of the pressing amount conversion table 223 and the cam shaft position information 222, the arithmetic portion 201 acquires the angle of rotation of the cam 27 necessary to adjust the penetration amount Y to a predetermined entering amount. Then, depending on a result thereof, the cam 27 is rotated by operating the cam driving motor 211 by a necessary control amount by the drive controller 210.

Further, in this embodiment, the user provides an instruction from an input portion of the operating portion 101 to the controller 200 so as to adjust the penetration amount Y. Further, the arithmetic portion 201 of the controller 200 reflects information on the penetration amount Y designated by the user through the input portion of the operating portion 101 in an operation of the urging cam driving motor 211. Incidentally, in this embodiment, the adjustment of the penetration amount Y is instructed through the operating portion 101, but can also be instructed from the external device communicatably connected to the image forming apparatus 100. In this case, the above-described interface portion (input/output circuit) and the like function as the input portion.

5. Detailed Structure of Pressing Member

Next, a detailed structure of the pressing member 26 in this embodiment will be described. FIG. 5 is a schematic sectional view of a neighborhood of the pressing member 26 in this embodiment as viewed substantially in parallel to the rotational axis direction of the inner roller 21.

In this embodiment, on a surface of the pressing member 26 on the intermediary transfer belt 6 side, a coating member (shielding member, electroconductive member) 29 is provided so as not to contact the intermediary transfer belt 6. In this embodiment, the coating member 29 is applied to the surface of the pressing member 26 on the intermediary transfer belt 6 side. Incidentally, the coating member 29 does not contact the intermediary transfer belt 6 even when the pressing member 26 is positioned in any position within a movable range thereof. In this embodiment, as described above, the pressing member 26 is constituted by the sheet-like member having a substantially rectangular shape. In this embodiment, the coating member 29 is also similarly constituted by a sheet-like member which has a predetermined length with respect to each of a longitudinal direction substantially parallel to the widthwise direction of the intermediary transfer belt 6 and a shaft-side direction substantially perpendicular to the longitudinal direction, which has a predetermined thickness, and which has a substantially rectangular shape in plan view.

The pressing member 26 is formed in general with a member having no electroconductivity, such as PPS (polyphenylene sulfide), PET (polyethylene terephthalate) or PEEK (polyether ether ketone). In this embodiment, the pressing member 26 is formed with PPS. Further, the thickness of the pressing member 26 is about 0.4-1.5 mm, typically about 0.5-1.0 mm. The pressing member 26 formed of such a resin material is capable of elastically urging the intermediary transfer belt 6 by utilizing flex elasticity. On the other hand, the coating member 29 is formed with a member having electroconductivity in general including metal such as a copper foil tape or SUS metal plate, and an electroconductive resin material such as a resin sheet containing an electroconductive material as a filler. In this embodiment, the coating member 29 is formed with a polyethylene sheet containing carbon black. Further, in this embodiment, the coating member 29 is applied onto the surface of the pressing member 26 on the intermediary transfer belt 6 side with use of an electroconductive double-side tape. Incidentally, the coating member 29 can be fixed to the pressing member 26 by any fixing means such as bonding, adhesion, fusion, engagement (lock), or the like. Further, in this embodiment, the coating member 29 is electrically grounded (connected to main assembly ground).

In this embodiment, as regards a polyethylene sheet containing carbon black used as the coating member 29, when the surface resistivity was measured using an ASP probe of a resistivity meter ("Loresta GP", manufactured by Mitsubishi Chemical Corp.), the surface resistivity was $1.0\times10^{8}\Omega/\square$. Incidentally, the surface resistivity of the coating member 29 (surface exposed to the intermediary transfer belt 6 side) may preferably be $1.0\times10^{8}\Omega/\square$ or less and may be $0\Omega/\square$, from a viewpoint of suppression of toner scattering (described later). On the other hand, the surface resistivity of the pressing member 26 (surface exposed to the intermediary transfer belt 6 side) is typically $10^{13}\Omega/\square$ or more ($10^{18}\Omega/\square$ or less in general).

Further, in this embodiment, the coating member 29 is provided on the surface of the pressing member 26 on the intermediary transfer belt 6 side so as to cover the pressing member 26 from a downstream side of a region, opposing a position 6*a* of the intermediary transfer belt 6 where the feeding guide 11 is closest to the intermediary transfer belt 6, to an upstream side of this region with respect to the recording material feeding direction of the intermediary transfer belt 6. That is, when the coating member 29 is viewed along a rotational axis direction (widthwise direction of the intermediary transfer belt 6) of the inner roller 21, the coating member 29 is disposed on the surface of the pressing member 26 on the intermediary transfer belt 26 side over from a downstream side to an upstream side of a position crossing a rectilinear line which is substantially perpendicular to the surface of the intermediary transfer belt 6 and which passes through a position of the feeding guide 11 closest to the intermediary transfer belt 6. Incidentally, in this embodiment, a loading end of a first feeding guide 11*a* of the feeding guide 11 on a downstream side with respect to the feeding direction of the recording material P is closest to the intermediary transfer belt 6. However, the position where the feeding guide 11 is closest to the intermediary transfer belt 6 may be a portion other than the leading end of the first feeding guide 11*a*, and a leading end of a second feeding guide 11*b* or another portion may be closest to the intermediary transfer belt 6. In this embodiment, a closest distance between the feeding guide 11 and the intermediary transfer belt 6 is about 2-3 mm.

Specifically, in this embodiment, the coating member 29 is continuously formed on the surface of the pressing member 26 on the intermediary transfer belt 6 side in a region which is a predetermined region from a base end 26*b* toward a leading end 26*a* side of the pressing member 26 with respect to a short-side direction of the pressing member 26 and which includes a region opposing the position 6*a* of the intermediary transfer belt 6 where the feeding guide 11 is closest to the intermediary transfer belt 6. Further, in this embodiment, on the surface of the pressing member 26 in a remaining region from the leading end 26*a* toward the base end 26*b* of the pressing member 26 with respect to the short-side direction, the coating member 29 is not disposed. Further, in this embodiment, the coating member 29 is continuously provided so as to cover a substantially entire region of the pressing member 26 with respect to the longitudinal direction of the pressing member 26.

Incidentally, the pressing member can be regarded as a member including at least two layers including a main portion (non-electroconductive portion, pressing portion, first sheet portion) and a coating portion (electroconductive portion, shielding portion, second sheet portion).

6. Evaluation Experiment

A result of an evaluation experiment for some constitutions including the constitution of this embodiment will be described.

6-1. EXPERIMENT EXAMPLES

Experiment Example 1

A constitution of an experiment example 1 is the constitution of this embodiment.

Experiment Example 2

A constitution of an experiment example 2 is the same as the constitution of the embodiment 1 (experiment example 1) except for a detailed structure of the pressing member 26. FIG. 6 is a schematic sectional view of a neighborhood of a pressing member 26 in this experiment example as viewed substantially parallel to a rotational axis direction of an inner roller 21.

In this experiment example, a coating member 29 is electrically conducted to the feeding guide 11 (first and second feeding guides 11*a* and 11*b*). In this experiment example, the coating member 29 and the feeding guide 11 (first and second feeding guides 11*a* and 11*b*) are in an electrically float state. Other detailed structures of the pressing member 26 are the same as those in the embodiment 1 (experiment example 1).

Experiment Example 3

A constitution of an experiment example 3 is the same as the constitution of the embodiment 1 (experiment example 1) except for a detailed structure of the pressing member 26. FIG. 7 is a schematic sectional view of a neighborhood of a pressing member 26 in this experiment example as viewed substantially parallel to a rotational axis direction of an inner roller 21.

In this experiment example, in a region corresponding to the region in which the coating member 29 for the pressing member 26 in the embodiment 1 (experiment example 1) was provided, a coating member 29 constituted by a coat layer obtained by coating a surface of the pressing member 26 with an electroconductive substance was provided. Specifically, a region other than the region where the coating member 29 for the pressing member 26 was provided was covered with a masking tape, and platinum was vapor-deposited on the pressing member surface, so that the coating member 29 was disposed. Other detailed structures of the pressing member 26 are the same as those in the embodiment 1 (experiment example 1).

Experiment Example 4

A constitution of an experiment example 4 is the same as the constitution of the embodiment 1 (experiment example 1) except for an application constitution of the secondary transfer voltage to the secondary transfer portion N2. FIG. 8 is a schematic sectional view of an image forming apparatus 100 of this experiment example.

In this experiment example, to the inner roller 21, a secondary transfer voltage which has the same polarity as the normal charge polarity of the toner and which is a DC voltage subjected to constant-voltage control is applied from the secondary transfer power source 10. For example, the secondary transfer voltage of −1 to −7 kV is applied, so that a secondary transfer current of −40 to −120 μA is caused to flow and thus the toner image is secondary-transferred from the intermediary transfer belt 6 onto the recording material P. Other constitutions of the image forming apparatus 100 are the same as those of the image forming apparatus 100 of the embodiment 1 (experiment example 1).

Experimental Example 5

In an experiment example 5, the coating member 29 is not provided, and the secondary transfer voltage which has the same polarity as the normal charge polarity of the toner and which is the DC voltage subjected to the constant-voltage control is applied from the secondary transfer power source 10 to the inner roller 21. Other constitutions of the image forming apparatus 100 are the same as those of the image forming apparatus 100 of the embodiment 1 (experiment example 1).

Experimental Experiment Example 6

In an experiment example 6, the coating member 29 is not provided. Other constitutions are the same as those of the image forming apparatus 100 of the embodiment 1 (experiment example 1).

Experiment Example 7

A constitution of an experiment example 7 is the same as the constitution of the embodiment 1 (experiment example 1) except for a detailed structure of the pressing member 26. FIG. 9 is a schematic sectional view of a neighborhood of a pressing member 26 in this experiment example as viewed substantially parallel to a rotational axis direction of an inner roller 21.

In this experiment example, the coating member 29 is applied to the pressing member 26 in a manner such that the region thereof is narrowed to only an upstream side with respect to the feeding direction of the intermediary transfer belt 6 so as not to include the region opposing the intermediary transfer belt 6 in the position 6*a* where the feeding guide 11 is closest to the intermediary transfer belt 6. However, also in this experiment example, with respect to the feeding direction of the intermediary transfer belt 6, the coating member 29 is provided on the surface of the pressing member 26 on the intermediary transfer belt 6 side so that the coating member 29 and at least a part of the feeding guide 11 overlap with each other. In other words, when the coating member 29 and the feeding guide 11 are viewed in the widthwise direction of the intermediary transfer belt 6, the case where each of the coating member 29 and the feeding guide 11 is projected onto the intermediary transfer belt 6 with respect to a direction perpendicular to the feeding direction of the intermediary transfer belt 6 will be considered. In this case, the coating member 29 is disposed on the surface of the pressing member 26 on the intermediary transfer belt 6 side so that at least a part of each of the resultant projected regions overlaps with each other. Specifically, in this embodiment, the coating member 29 is continuously disposed on the surface of the pressing member 26 on the intermediary transfer belt 6 side in a region which is a predetermined region from the base end 26*b* toward the leading end 26*a* side with respect to the short-side direction of the pressing member 26 and which is positioned on the base end 26*b* side rather than a region opposing the intermediary transfer belt 6 in the position 6*a* where the feeding guide 11 is closest to the intermediary transfer belt 6. Further, in this experiment example, the coating member 29 is not disposed on the surface of the pressing member 26 on the intermediary transfer belt 6 side in a remaining region of the pressing member 26 from the leading end 26*a* toward the base end 26*b* side with respect to the short-side direction of the pressing member 26. Other detailed structures of the pressing member 26 are the same as those of the pressing member 26 in the embodiment 1 (experiment example 1).

Experiment Example 8

A constitution of an experiment example 8 is the same as the constitution of the embodiment 1 (experiment example 1) except for a detailed structure of the pressing member 26. FIG. 10 is a schematic sectional view of a neighborhood of a pressing member 26 in this experiment example as viewed substantially parallel to a rotational axis direction of an inner roller 21.

In this experiment example, the coating member 29 is applied to the pressing member 26 so that a region thereof is expanded so as to contact the intermediary transfer belt 6. Specifically, in this embodiment, the coating member 29 is continuously disposed from the base end 26*b* to the leading end 26*a* with respect to the short-side direction of the pressing member 26 so as to include a region opposing the intermediary transfer belt 6 in the position 6*a* where the feeding guide 11 is closest to the intermediary transfer belt 6 is. Other detailed structures of the pressing member 26 are the same as those of the pressing member 26 in the embodiment 1 (experiment example 1).

6-2. Experimental Method and Result 6-2. EXPERIMENTAL METHOD AND RESULT

By using the image forming apparatus (copying machine) 100 having the constitution in accordance with this embodiment, a sheet passing durability test for the above-described constitutions of the experiment examples 1 to 8 was conducted. Specifically, in a low-humidity environment (temperature: 23° C., relative humidity: 5% RH), by using an image forming apparatus ("image PRESS C910", manufactured by Canon K.K.), a durability test in which images were formed on 100K ($\times 10^3$) sheets (A4-size sheets, "GF-0081", available from Canon K.K.) was conducted, and then degree of contamination of the feeding guide 11 with the toner was observed. Evaluation results for the experiment examples 1 to 8 are shown in FIG. 11. Evaluation was made such that the case where substantially no contamination was observed was evaluated as "o" (good), the case where slight contamination was observed was evaluated as "Δ" (practically no problem), the case where problematic contamination was observed was evaluated as "x" (poor), and the case where conspicuous contamination was observed was evaluated as "xx" (very poor), (guide contamination result after sheet passing durability test ("G.C.R. AFTER SHT PSSNG")). Further, a solid (whole surface) secondary color image of cyan and magenta was outputted, and then occurrence or non-occurrence of a transfer void was observed. Evaluation was made such that the case where the transfer void was not observed was evaluated as "o" (good), and the case where the transfer void was observed was evaluated as "x" (poor) ("I.E.R."). Incidentally, a surface potential of each of the intermediary transfer belt 6 and the feeding guide 11 was measured using a commercially available surface potential meter. For convenience, although a measurement result of the surface potential of the intermediary transfer belt 6 was shown, it has been known that the surface potential of the pressing member 26 is substantially equal to the surface potential of the intermediary transfer belt 6. Further, in FIG. 11, "CNDCTN RLTNSHP" represents a conduction relationship, "H.V. APPLY MEMBER" represents a high-voltage application member, and "H.V.V." represents a high-voltage value.

First, as regards the experiment example 5 (comparison example), conspicuous contamination was observed. When the surface potential of the intermediary transfer belt 6 in the position 6*a* where the feeding guide 11 is closest to the intermediary transfer belt 6 was measured, the intermediary transfer belt 6 was charged to −2 kV. Further, when the surface potential of the feeding guide 11 during sheet passing was measured, the feeding guide 11 was charged only to about −0.2 kV. That is, between the intermediary transfer belt 6 and the feeding guide 11, a potential difference ("S.P. DFFNC") of −1.8 kV is caused, so that it would be considered that by this potential difference, the toner of which principal charge polarity is the negative (−) polarity scatters onto the feeding guide 11.

Next, as regards the experiment example 6 (comparison example), problematic contamination was observed. When the surface potentials of the intermediary transfer belt 6 and the feeding guide 11 were measured similarly as in the above-described manner, the surface potentials were +1.0 kV and −0.2 kV, respectively. A potential difference of +1.2 kV is caused between the intermediary transfer belt 6 and the feeding guide 11. However, different from the experiment example 5, the intermediary transfer belt 6 is higher in surface potential than the feeding guide 11 in the positive (+) polarity direction, and therefore, it would be considered that the toner of the opposite polarity (positive polarity) to the principal charge polarity of the toner scatters onto the feeding guide 11. The number of toner particles of the opposite polarity (positive polarity) to the principal charge polarity of the toner is small, so that it would be considered that the degree of the contamination remains lighter than in the experiment example 5.

Next, as regards the experiment example 7 (embodiment 1), slight contamination was observed. As a factor that the slight contamination was observed in the experiment example 7, the following can be cited. That is, the coating member 29 is not applied onto the region opposing the intermediary transfer belt 6 in the position 6*a* where the feeding guide 11 is closest to the intermediary transfer belt 6. For that reason, the surface potential of the intermediary transfer belt 6 is +1.0 kV which is relatively high, so that it would be considered that an effect of decreasing the potential difference between the intermediary transfer belt 6 and the feeding guide 11 is lowered when compared with the experiment example 1 (described later).

Next, as regards the experiment example 6 (comparison example), although the contamination of the feeding guide 11 was not observed, the transfer void was observed. This would be considered because the transfer current to be originally caused to flow through the secondary transfer portion is leaked through the coating member 28 by contact of the coating member 29 having electroconductivity with the intermediary transfer belt 6.

On the other hand, as regards the experiment examples 1 to 4 (embodiment 1), the contamination of the feeding guide 11 and the transfer void were not observed, so that a good result was obtained. In the experiment examples 1, 3 and 4, the coating member 29 having the conductivity is electrically grounded, so that the surface potential of the intermediary transfer belt 6 is suppressed to a low level. For that reason, the potential difference between the intermediary transfer belt 6 and the feeding guide 11 becomes small. In the experiment example 2, although the surface potential of the intermediary transfer belt 6 is 1.0 kV which is high, the coating member 29 having the electroconductivity is conducted to the feeding guide 11 having the electroconductivity ("CNDCTN WITH GUIDE"), and therefore, the potential difference between the intermediary transfer belt 6 and the feeding 11 becomes small. For the above-described reasons, it would be considered that a good result was obtained in the experiment examples 1 to 4.

7. Effect

Thus, the image forming apparatus 100 of the embodiment 1 according to the present invention includes the rotatable endless belt 6, the plurality of stretching rollers which are the stretching rollers for stretching the belt 6 and which includes the inner roller 21 and the upstream roller 24 disposed upstream of and adjacent to the inner roller 21 with respect to the rotational direction of the belt 6, the outer member 9 for forming the transfer portion N2 where the toner image is transferred from the belt 6 onto the recording material P in contact with the outer peripheral surface of the belt 6, the guiding member 11 for guiding the recording material P to the transfer portion N2, the sheet-like pressing member 26 contactable to the inner peripheral surface of the belt 6 on a side upstream of the inner roller 21 and downstream of the upstream roller 24 with respect to the rotational direction of the belt 6, and the coating member 29 provided on the belt-side surface of the pressing member 26 so as not to contact the belt 6, and the coating member 29 is lower in surface resistivity than the pressing member 26 and is electrically grounded. Further, the coating member 29 may be electrically conducted to the guiding member 11. In the case where the plurality of guiding members 11 are provided, the coating member 29 may preferably be electrically conducted to at least the guiding member 11 closest to the belt 6.

Further, it is preferable that the coating member 29 is provided so that with respect to the movement direction of the belt 6, the coating member 29 and at least a part of the guiding member 11 overlap with each other. More preferably, the coating member 29 is disposed so as to include the region opposing the belt 6 in the position 6*a* where the guiding member 11 is closest to the belt 6, from the side downstream of the region to the side upstream of the region with respect to the movement direction of the belt. Incidentally, the pressing member 26 is disposed so that the longitudinal direction thereof is substantially parallel to the widthwise direction of the belt, and with respect to the movement direction of the belt 6, the upstream-side end portion of the coating member 26 in the short-side direction is held by the holding member 28 and the downstream-side end portion of the coating member 26 in the short-side direction is contactable to the inner peripheral surface of the belt 6. Further, it is preferable that the surface resistivity of the coating member 29 is $1\times10^{8}\Omega/\square$ or less. Further, typically, the surface resistivity of the pressing member 26 is $1\times10^{13}\Omega/\square$ or more. Further, during the transfer, the voltage of the opposite polarity to the normal charge polarity of the toner is applied to the outer member 9 or the voltage of the same polarity as the normal charge polarity of the toner is applied to the inner roller 21. Further, in this embodiment, the belt 6 is the intermediary transfer member for conveying the toner image, primary transferred from the image bearing member, so as to transfer the toner image onto the recording material P in the transfer portion N2.

Incidentally, a length of the coating member 29 with respect to the longitudinal direction of the pressing member 26 is typically substantially the same as a length of the pressing member 26 with respect to the longitudinal direction, but may be shorter than the length of the pressing member 26 with respect to the longitudinal direction in a range in which the toner scattering onto the feeding guide 11 is capable of being sufficiently reduced. Further, in the range, the coating member 29 may be divided without being continuously formed with respect to at least one of the longitudinal direction and the short-side direction of the pressing member 26. However, it is preferred from the viewpoint of reducing the toner scattering onto the guiding member 11 that the coating member 29 is continuously disposed so as to cover a substantially whole area of the longitudinal region of the pressing member 26 opposing the guiding member 11. Further, the pressing member 26 is applied onto a mounting portion, such as a metal plate constituted by metal (electroconductive member) such as SUS, and then this mounting portion may be fixed to the holding member with a screw or the like. In this case, the coating member 29 may be electrically grounded via the electroconductive mounting portion or may be electrically conducted to the feeding guide 11.

As described above, according to the constitution in this embodiment according to the present invention, on the surface of the pressing member 26, the region covered with the coating member (shielding member, electroconductive member) 29 is provided, so that the degree of the toner scattering onto the feeding guide 11 can be alleviated. That is, according to this embodiment in accordance with the present invention, in the constitution in which the pressing member for pressing the belt from the back surface of the belt is provided, it becomes possible to suppress the toner scattering onto the feeding guide. By this, it is possible to not only reduce a risk of the toner contamination of the recording material P but also reduce a service load (cleaning operation).

Other Embodiments

The present invention was described above based on specific embodiments, but is not limited thereto.

In the above-described embodiments, as an outer member for forming the secondary transfer nip in cooperation with the inner roller as an inner member, the outer roller directly contacting the outer peripheral surface of the intermediary transfer belt was used. On the other hand, a constitution in which as the outer member, the outer roller and a secondary transfer belt stretched by the outer roller and other rollers are used may also be employed. That is, the image forming apparatus may include, as the outer member, the stretching rollers, the outer roller and the secondary transfer belt stretched between these rollers. Further, the secondary transfer roller is contacted to the outer peripheral surface of the intermediary transfer belt by the outer roller. In such a constitution, by the inner roller contacting the inner peripheral surface of the intermediary transfer belt and the outer roller contacting the inner peripheral surface of the secondary transfer belt, the intermediary transfer belt and the secondary transfer belt are sandwiched, so that the secondary transfer nip is formed. In this case, a contact portion between the intermediary transfer belt and the secondary transfer belt is the secondary transfer nip as the secondary transfer portion.

In the above-described embodiments, as the pressing mechanism, an actuator for actuating the movable portion by the cam was used, but the offset mechanism is not limited thereto. The pressing mechanism may only be required to be capable of realizing an operation in conformity with each of the above-described embodiments, and for example, an actuator for actuating the movable portion by using a solenoid, for example, may be used.

Further, the pressing member is not limited to the movable member, but for example, may be fixedly disposed so that the entering amount of the pressing member into the pressing member becomes a predetermined entering amount.

Further, in the above-described embodiments, the case where the belt-shaped image bearing member was the intermediary transfer belt was described, but the present invention is applicable when an image bearing member constituted by an endless belt for feeding the toner image borne at the image forming position is used. Examples of such a belt-shaped image bearing member may include a photosensitive (member) belt and an electrostatic recording dielectric (member) belt, in addition to the intermediary transfer belt in the above-described embodiments.

Further, the present invention can be carried out also in other embodiments in which a part or all of the constitutions of the above-described embodiments are replaced with alternative constitutions thereof. Accordingly, when the image forming apparatus using the belt-shaped image bearing member is used, the present invention can be carried out with no distinction as to tandem type/single drum type, a charging type, an electrostatic image forming type, a developing type, a transfer type and a fixing type. In the above-described embodiments, a principal part relating to the toner image formation/transfer was described principally, but the present invention can be carried out in various uses, such as printers, various printing machines, copying machines, facsimile machines and multi-function machines, by adding necessary device, equipment and a casing structure.

According to the present invention, in the constitution in which the pressing member for pressing the belt from the back surface is provided, the degree of the toner scattering onto the region is capable of being suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-173543 filed on Oct. 22, 2021, which is hereby incorporated by reference herein in its entirety.

What is claimed is:

1. An image forming apparatus comprising:

an image forming portion configured to form a toner image;

a rotatable endless belt onto which the toner image is transferred;

a plurality of stretching rollers including an inner roller and an upstream roller provided upstream of and adjacent to the inner roller with respect to a rotational direction of the belt and configured to stretch the belt;

an outer member provided opposed to the inner roller through the belt and configured to form a transfer portion where the toner image is transferred from the belt onto a recording material in contact with an outer peripheral surface of the belt;

a guiding member configured to guide the recording material to the transfer portion;

a sheet-like pressing member contactable to an inner peripheral surface of the belt on a side upstream of the inner roller and downstream of the upstream roller with respect to the rotational direction of the belt; and a coating member provided on a surface of the pressing member on a belt side and configured to cover a portion of the surface of the pressing member, wherein the coating member is disposed on the pressing member so as not to contact the belt and is electrically grounded or electrically conducted to the guiding member, the coating member being formed of a material lower in surface resistivity than the pressing member.

2. An image forming apparatus according to claim 1, wherein the coating member is disposed so as to overlap with at least a part of the guiding member with respect to a direction perpendicular to a movement direction of the belt.

3. An image forming apparatus according to claim 1, wherein the coating member is disposed so as to include a region opposing the belt at a location where the guiding member is closest to the belt, and defined by a side downstream of the region to a side upstream of the region with respect to a movement direction of the belt.

4. An image forming apparatus according to claim 1, wherein the pressing member is disposed along a widthwise direction of the belt so that an upstream-side end portion thereof with respect to a movement direction of the belt is held by a holding member and a downstream-side end portion thereof with respect to the movement direction of the belt is contactable to the inner peripheral surface of the belt.

5. An image forming apparatus according to claim 1, wherein the coating member has surface resistivity of $1\times10^{8}\Omega/\square$ or less.

6. An image forming apparatus according to claim 1, wherein the pressing member has surface resistivity of $1\times10^{13}\Omega/\square$ or more.

7. An image forming apparatus according to claim 1, wherein a voltage of an opposite polarity to a normal charge polarity of toner is applied to the outer member during transfer.

8. An image forming apparatus according to claim 1, wherein a voltage of a same polarity as a normal charge polarity of toner is applied to the inner roller during transfer.

9. An image forming apparatus according to claim 1, wherein the belt is an intermediary transfer member configured to convey the toner image, primary-transferred from an image bearing member, to be secondary-transferred onto the recording material at the transfer portion.

* * * * *